United States Patent [19]

Shimano

[11] 4,443,008
[45] Apr. 17, 1984

[54] RUNNING TYPE HEALTH PROMOTING DEVICE

[75] Inventor: Keizo Shimano, Osaka, Japan

[73] Assignee: Shimano Industrial Company Limited, Osaka, Japan

[21] Appl. No.: 204,912

[22] Filed: Nov. 7, 1980

[30] Foreign Application Priority Data

Nov. 22, 1979 [JP] Japan .................................. 54-151639

[51] Int. Cl.³ ........................ A63B 21/00; A63B 23/04
[52] U.S. Cl. .................................... 272/73; 273/86 R; 434/61; 272/DIG. 5; 272/DIG. 6
[58] Field of Search ........................ 272/69, 70, 72, 73, 272/129, 130, DIG. 5, DIG. 6; 364/424, 561, 565; 434/61, 69, 71; 273/85 G, 86 R

[56] References Cited

U.S. PATENT DOCUMENTS

| | | |
|---|---|---|
| 3,846,701 | 11/1974 | Sampey . |
| 3,903,613 | 9/1975 | Bisberg ................. 434/71 |
| 4,071,892 | 1/1978 | Genzling ............... 364/424 |
| 4,150,497 | 4/1979 | Weber .................. 434/71 |
| 4,162,792 | 7/1979 | Chang et al. .......... 273/85 G |
| 4,192,000 | 3/1980 | Lipsey ................. 272/DIG. 5 |
| 4,244,021 | 1/1981 | Chiles ................. 273/73 |
| 4,278,095 | 7/1981 | Lapeyre ................ 273/DIG. 28 |

FOREIGN PATENT DOCUMENTS

| | | |
|---|---|---|
| 2400403 | 7/1975 | Fed. Rep. of Germany . |
| 2308910 | 11/1976 | France . |
| 2402439 | 4/1979 | France . |
| 2016934 | 9/1979 | United Kingdom ........ 272/73 |

Primary Examiner—Vance Y. Hum
Assistant Examiner—Leo P. Picard
Attorney, Agent, or Firm—Stevens, Davis, Miller & Mosher

[57] ABSTRACT

A running type health promoting device, in which a running vehicle having at least one front wheel and one rear wheel to be driven by pedalling, the vehicle being incorporated with; a microprocessing unit which sets a period of time for training and a proper number of pulses during the training so as to obtain a proper quantity of exercise; a pulse detector for detecting the pulse of a driver who drives the vehicle; a measuring instrument for measuring the time period for training; an indicator for displaying a finish of the time period for training; and a source of electric energy; so that the driver can take proper exercise with interest correspondingly to his age or the like.

9 Claims, 4 Drawing Figures

RUNNING TYPE HEALTH PROMOTING DEVICE

FIELD OF THE INVENTION

This invention relates to running type health promoting devices, and more particularly to devices which employ a vehicle having at least one front wheel and rear wheel driven by pedalling, so that a driver can promote his health.

BACKGROUND OF THE INVENTION

For the purpose of promoting one's health, bodily exercise is taken by running or cycling. However, a person will often lose interest in such monotonous running or cycling without any measure of performance and therefore discontinue the exercise. Also, exercise is taken having little knowledge of what is proper exercise for a particular person.

Conventionally, there have not been devices which gives a person exercising an indication accurate and proper for him, for example, an indication of the number of revolutions of the pedals of a bicycle. Therefore, a limited amount of exercise will not promote health, alternatively, rather excessive exercise will result in fatigue.

SUMMARY OF THE INVENTION

This invention has been designed in order to overcome the aforesaid problem. An object of the invention is to provide a running type health promoting device by which anyone can achieve bodily exercise simply by pedalling with the proper pulse count corresponding to his age, sex distinction, height, and weight, during a constant period of time for training, and furthermore, repeat exercise every day to naturally promote his health.

In detail, this invention is so designed that a vehicle provided with at least one front wheel and rear wheel and driven by pedalling, includes; a micro processing unit which receives as an input personal information, such as a driver's age, sex distinction, height and weight, so as to set a period of time for training and a proper pulse count during the training time to determine a proper amount of exercise, thereby indicating a proper number of revolutions of the pedals; a pulse detector for detecting the pulse of the driver driving the vehicle; a measuring instrument for measuring the period of time for training; an indicator for indicating a termination of the period of time for training; and a source of electric energy; so that the driver can properly exercise corresponding to his age or physical condition.

The aforesaid running vehicle uses a vehicle such as a bicycle, which drives its rear wheel by pedalling through a transmission comprising a front chain gear incorporated with pedal means, a rear chain gear, and a driving chain carried by both the front and rear gears, so that the driver's body is subjected to a load through pedalling.

The aforesaid load varies according to conditions of the road surface on which the vehicle is running, but can, on the basis of a paved and level road surface, be approximately determined by the number of revolutions of the pedals or a gear ratio of the front chain gear to the rear one, and the diameters of the front and rear wheels.

The load, when the diameters of both the wheels are constant, is changed by changing the gear ratio. The gear ratio is readily changeable in such a manner that the front chain gear or rear chain gear, preferably the rear chain gear, is comprises a plurality of chain gears of different diameters, or both the chain gears are composed of plurality of chain gears of different diameters respectively, so that a derailleur is used to switch therewith the chain to a desired gear of a plurality of chain gears.

Accordingly, a device in accordance with the invention, firstly, indicates through, for example, pitch sounds, the number of revolutions of the pedals to be matched with the driver's pulse set by an input given from his personal information for a constant load condition, so that the driver can pedal the vehicle to meet the pitch sounds continuously during an exercise period for training, thereby exercising for the promotion of health, and secondly, he can pedal the vehicle under different load conditions by changing the gear ratio, so that various combinations of the gear ratio with the number of revolutions of the pedals enable him to take proper exercise to promote his health.

In addition, the health promotion provided by this invention includes fat-reducing or disease prevention, e.g., heart disease prevention, as well as physical training. The exercise possible to promote one's health means moderate exercise avoiding either the effect of a short quantity of exercise notwithstanding the driver purposely takes exercise, or excessive exercise which makes him fatigued.

BRIEF DESCRIPTION OF THE DRAWINGS

The invention is illustrated by way of example in the accompanying drawings which form part of this application and in which.

DETAILED DESCRIPTION OF THE INVENTION

Figure 1:
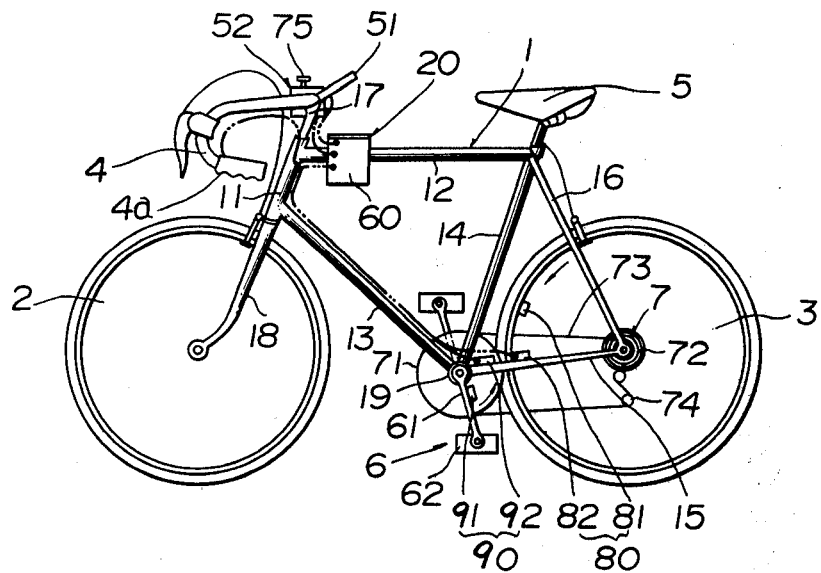
FIG. 1 is a general elevation of an embodiment of the invention.

Referring to the drawings, a bicycle is used as the running vehicle of the invention, which comprises a frame 1, a front wheel 2 and a rear wheel 3 supported to the frame 1, a steering handle bar 4, a saddle 5, a pedal device 6, and a transmission 7 for transmitting motion of the pedal device 6 to the rear wheel 3.

The frame 1 comprises a combination of a head pipe 11, top tube 12, a down tube 13, a seat tube 14, a chain stay 15 and a back fork 16. A handle stem 17 carrying the handle bar 4 and a front fork 18 are supported rotatably to the head pipe 11, the front fork 18 supporting the front wheel 2 rotatably. The pedal device 6 is supported to a bottom bracket 19 provided at the interconnecting portion of the down tube 13, seat tube 14 and chain stay 15, and the rear wheel 3 is supported rotatably at the interconnecting portion of the chain stay 15 and back fork 16.

The pedal device 6 comprises a crank means 61 supported rotatably to the bottom bracket 19 and a pair of pedals 62 mounted on the crank means 61. The transmission 7 comprises a front chain gear 71 mounted on the crank means 61, a rear chain gear 72 supported to a hub shaft of the rear wheel 3, and a driving chain 73 stretched across the chain gears 71 and 72, so that the pedal device 6 is pedalled to transmit a driving force therefrom to the rear wheeel 3, thus driving the rear wheel 3.

The bicycle shown in FIG. 1 has a plurality of rear chain gears 72 of different diameters and is provided at the interconnecting portion of the chain stay 15 and back fork 16 with a derailleur 74 positioned in proximity to the rear chain gears 72, so that the derailleur 74 switches the chain 73 to a desired one of the rear chain gear 72, thereby changing a gear ratio.

The derailleur 74 is operated by a control lever 75 provided at the handle bar 4 or the top of handle stem 17, thereby switching the chain 73 to one of the rear chain gears 72.

The aforesaid is the usual construction of a bicycle, which will be understandable without further detailed description.

This invention is directed to the use of a running vehicle, such as a bicycle, constructed as foregoing, by which a driver can properly exercise. In detail, the vehicle is incorporated with; a microprocessing unit 20 having a processing circuit which reviews an input comprising personal information A, such as the driver's age, sex distinction, height, and weight, and sets a period of time for his training and a proper pulse during the training to thereby indicate the number of revolutions of pedals 62; a pulse detector 30 which is connected electrically with the input side of the microprocessing unit 20, detects the pulses and feeds a detection signal into the microprocessing unit 20; a measuring instrument 40 for measuring the period of time for training so as to feed a timing signal to the microprocessing unit 20; an indicator 50 which is connected electrically with the output side of the microprocessing unit 20, indicates the number of revolutions of pedals 62 matching the proper number of pulses set by the microprocessing unit 20, and displays completion of the training carried out under the set number of pulses during the set time period; and a source 60 of electric energy is provided.

Figure 2:
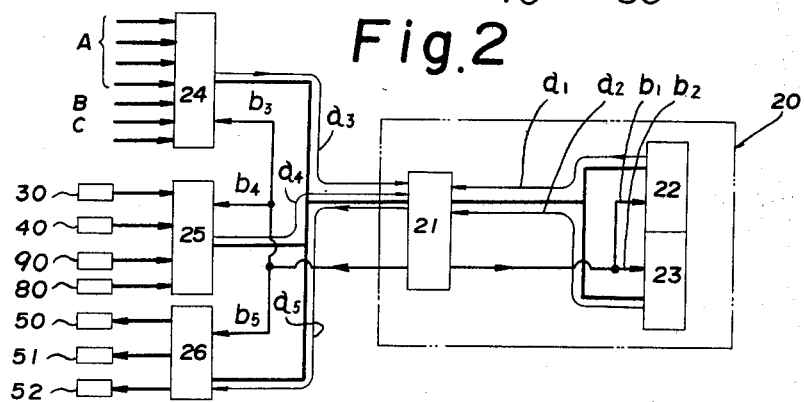
FIG. 2 is a block diagram of an electric circuit at the FIG. 1 embodiment.

The microprocessing unit 20, as shown in FIG. 2, comprises a central arithmetic processing unit 21 and two first and second memory circuits 22 and 23, the arithmetic unit 21 communicating with the first and second memory circuits 22 and 23 by way of data lines $a_1$ and $a_2$. Signal lines $b_1$ and $b_2$ for actuating the data lines $a_1$ and $a_2$ connect the unit 21 and memory circuits 22 and 23 so that the first memory circuit 22 fixedly stores therein a series of operational programs processed by the arithmetic unit 21. The arithmetic unit 21 is given as input data the personal information A, pulse detection signal, timing signal for the time period for training, and signal of the number of revolutions of pedals 62, so that the input data is stored in the second memory circuit 23. When the bicycle is driven, the signal lines $b_1$ and $b_2$ are actuated to fetch the stored program and input data from the first and second memory circuits 22 and 23 through the data lines $a_1$ and $a_2$ and feed them to the arithmetic unit 21 to be operated as programmed, thereby giving each output to be hereinafter described, by which each display necessary for bringing the exercise into practice is given.

The microprocessing unit 20, as shown in FIG. 1, is mounted on the top tube 12 and combined with an input selection unit 24 for the personal information A and with the source 60 of electric energy, composed mainly of batteries.

The input selection unit 24 is provided with a keyboard (not shown) which communicates with the arithmetic unit 21 at the microprocessing unit 20 by way of a data line $a_3$ and a signal line $b_3$ for actuating the line $a_3$, whereby the keyboard is operated to feed the input datum of personal information A into the arithmetic unit 21 by way of data line $a_3$.

Referring to FIG. 2 reference numeral 25 designates an input selection unit for the pulse detection signal, measuring signal for the period for training, and signal for the number of revolutions of pedals 62. The input selection unit 25 communicates with the output sides at the pulse detector 30, measuring instrument 40, and a tachometer 90 to be hereinafter described, and with the arithmetic unit 21 at the microprocessing unit 20 by way of a data line $a_4$ and a signal line $b_4$ for actuating the line $a_4$, so that the above signals may be fed into the arithmetic unit 21 by way of data line $a_4$ respectively.

The pulse detector 30 communicating with the input selection unit 25 is not shown in detail, but may be formed to output an electrocardiographic wave form counted at every one cycle thereof, the electrocardiographic wave form being taken out of both electrodes provided, for example, at both grips 4a of handle bar 4, or may output a current wave form counted at every one cycle thereof, the current wave form being matched with the heart pulsation and being taken out of a photoelectric element in such a manner that a light-emitting diode projects an infrared ray on the driver's fingers gripping the handle grips 4a so that, when a blood flow in the blood vessel is intermitted, the ray perforates the vessel to strike finger bones and reflect therefrom, thereby being sensed by the photoelectric element, while, the ray, when the vessel is filled with blood, is absorbed therewith not to be sensed by the photoelectric element. Alternatively, the light-emitting diode and photoelectric element may be fixed to a clip sandwiching an ear-lobe of the driver so that the ray's transmission factor, and in turn, the sensitivity of the photoelectric element, may be changed correspondingly to a change in the flow rate of blood, so that a current wave form for matching with the blood pulsation may be received from the element and counted as an output at every one cycle of the current wave form.

The tachometer 90 for the pedals 62, as shown in FIG. 1, comprises a magnet 91 attached to the crank means 61, and a sensor 92, such as a Hall element, attached to the chain stay 15, so that an output signal of the sensor 92 is fed to the microprocessing unit 20 through the input selection unit 25, thereby calculating the number of revolutions of pedals 62 using a period of time measured from peak to peak value of the signal wave form output from the sensor 92.

In FIG. 2, reference numeral 26 designates an output selection unit for each output from the microprocessing unit 20. The output selection unit 26 communicates with the arithmetic unit 21 through a data line $a_5$ and a signal line $b_5$ for actuating the line $a_5$, and with the indicator 50 and indicators 51 and 52 to be hereinafter described.

The indicator 50 uses, for example, a buzzer, which generates at regular time intervals pitch sounds which inform the driver of the number of revolutions of pedals 62 to be matched with the number of pulses set by the microprocessing unit 20, and which generates, for example, continuous sounds to inform him of completion of the training.

Figure 3:
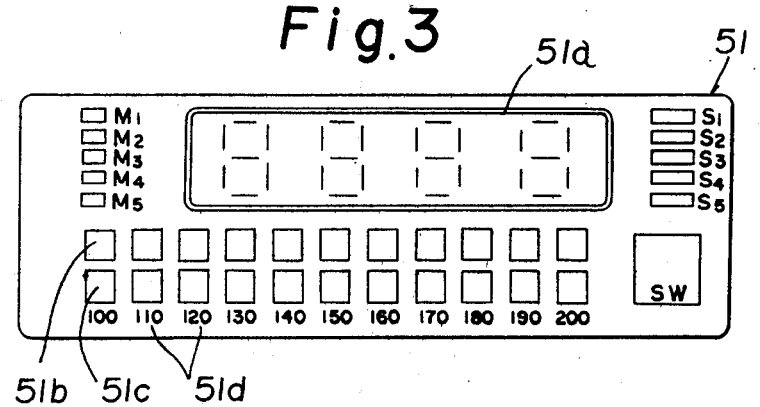
FIG. 3 is an elevation of an embodiment of an indicator.

The indicator 51 uses, for example, a light-emitting display or liquid crystal diode so that modes of running speed, distance and time, as well as the number of revolutions of pedals 62, are digital-displayed in four bits, and the set value and instant value of pulse are analogue-displayed by the light-emitting diode as shown in FIG. 3.

Incidentally, the indicator 51 is not indispensable for the present invention, but allows the drive to develop more interest in exercising and displays reference data. The indicator 51 is mounted on the top of handle stem 17 to facilitate his read-out.

In greater detail, the indicator 51 is provided at one side of an indicating unit 51a using, for example, liquid crystal display elements for analogue display, with a plurality of mode switches $S_1$ through $S_5$ and at the other side with mode display units $M_1$ through $M_5$ which each emit light when the respective mode switches $S_1$ through $S_5$ are turned on, so that one mode switch $S_1$ is turned on to allow one mode display unit $M_1$ corresponding thereto to emit light, thereby digital-displaying a desired mode value by the liquid crystal display unit.

Among the aforesaid display modes, a measuring instrument 80 for measuring the running speed and distance, is constructed basically similarly to the tachometer 90 which detects the number of revolutions of pedals 62 as shown in FIG. 1, and comprises a magnet 81 provided at a rim of rear wheel 3 and a sensor 82 at the chain stay 15. An output from the sensor 82 is given to the arithmetic unit 21 at the microprocessing unit 20 through the input selection unit 25, so that the running speed, distance and time, are calculated and the output of arithmetic unit 21 is received by the indicator 51 by way of the output selection unit 26, thereby making the above displays respectively.

The indicator 51 is provided with light-emitting diodes arranged in two rows of each eleven diodes 51b and 51c, the respective diodes 51b and 51c are attached with figures 51d in eleven steps from 100 to 200 at intervals of 10. The respective diodes 51b in the upper row display the set value of the proper number of pulses and those 51c in the lower row display an instant value of the number of pulses during the time period for exercise. In addition, in FIG. 3, reference SW designates a switch for the source of electric energy.

Figure 4:
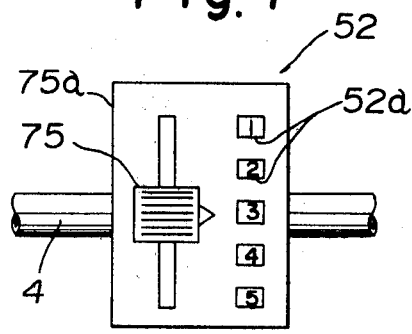
FIG. 4 is an elevation of a control unit for a derailleur, which unit is incorporated with an indicator for indicating a gear ratio.

The indicator 52, as shown in FIG. 4, comprises a plurality of display units 52a (five units are shown) of light-emitting diodes corresponding to the number of speed change stages and is provided at a cover 75a for a control lever 75 to operate the derailluer 74, so that a gear ratio between the chain gears is changed by the derailleur 74 to be indicated by a luminous display of each diode. Thus, the derailleur 74 changes the gear ratio to change the load applied to the driver by pedalling.

The indicator 52, as shown in FIG. 2, is connected to the output selection unit 26 similar to the indicators 50 and 51. The gear ratio suitable for the driver to take exercise under the proper number of pulses for a fixed period of time for training, is calculated by the microprocessing unit 20 and the output therefrom is then delivered to the indicator 52 by way of the output selection unit 26, so that the driver is given information of the proper gear ratio through the indicator 52.

Values of the number of revolutions of pedals 62 and the gear ratio to be matched with the set number of pulses displayed by the indicators 50, 51 and 52, are changed according to the exercise purpose in such a manner that target information B to comply with the purpose of the exercise is fed into the microprocessing unit 20 from the input selection unit 24, so that the microprocessing unit 20 calculates to change the set number of pulses, period of time for exercising, and gear ratio, thereby outputting each changed value thereof. For example, values of the set number of pulses to the training time period are determined as 120 by 60 min for the purpose of preventing a heart disease, 140 by 70 min for weight reduction, and 160 by 80 min for physical strength promotion, the gear ratios corresponding to the above values respectively. In addition, in FIG. 2, reference C designates information for the diameter of rear wheel 3.

Now, when the driver intends to exercise by use of the device of the invention constructed according to the foregoing, the personal information A, target information B, and rear wheel diameter information C are fed into the device.

The input of the respective information A through C allows the indicator 50 to generate pitch sounds indicating the number of revolutions of pedals 62, for example, pitch sounds of 70 revolutions per minute and also display a proper gear ratio.

Therefore, it is sufficient for the driver to practice training under the gear ratio displayed by the indicator 52 and the number of revolutions of pedals 62, which will be matched with pitch sounds generated by the same. In this instance, a fixed time period, e.g., 5 minutes, prior to a start of training, is alloted for measurement of his physical strength (warm-up), so that the number of pulses measured within the above time period may be used to compensate the number of revolutions of pedals 62 and gear ratio.

Next, the exercise, in a case where a proper pulse rate set by the personal information A and target information B for training is indicated by, for example, 120 and the number of revolutions of pedals 62 to be matched with the pulse rate is indicated to be 70 revolutions, will be described.

During the period of time set for warm-up, if the number of pulses is kept, for example, less than 110 even after the lapse of a fixed time, the indicator 50 generates pitch sounds corresponding to, for example, 75 revolutions more than the above 70 revolutions, whereby the driver will tread the pedals 62 at the pitch corresponding to 75 revolutions. When the number of pulses does not reach 110 even after raising the pitch resulting from the revolution of pedals 62, the indicator 52 will display a higher gear ratio, whereby the driver operates the control lever 75 to change the gear ratio as displayed. On the other hand, during the warming-up time period, when the number of pulses too rapidly increases to exceed the set value of 120, the indicator 50 generates reduced pitch sounds corresponding to, for example, 65 revolutions less than 70, at which time, the driver treads the pedals 62 at the pitch corresponding to 65 revolutions. Furthermore, when the number of pulses still remains in excess of 120 even after lowering the pitch, the indicator 52 displays the lower gear ratio, so that the control lever 75 is operated to change the gear ratio as displayed. After the lapse of five minutes for adjustment of the number of pulses in a range from 110 to 120, the indicator 50 generates buzzer sounds to inform the driver of completion of warm-up, and then he starts his training.

During the training, the indicator 50 generates pitch sounds corresponding to, for example, 70 revolutions to be matched with the personal information A and target information B, so that the driver treads the pedals 62 to match the pitch sounds to thereby bring his training in practice. Then, after the lapse of a given period of time for training, the indicator 50 generates sounds to inform him of completion of the training.

As seen from the above, such training corresponding to the personal information A and target information B enables the driver to take exercise in the quantity which is always not excessive but sufficient. The indicator 51 also displays through the light-emitting display or liquid crystal diode the number of revolutions of pedals 62, the set number of pulses, the measured number of pulses, the running speed, distance and time, and a value at each mode, whereby the driver can easily determine the value of each mode so as to have more interest in his training. Furthermore, the indicator 50 generates sounds for indicating the number of revolutions of pedals 62 and completion of training, thereby enabling the driver to be aware of the indication exactly day and night. As a result, he can practice the training at night.

In addition, during the above training, the device of the invention can indicate the gear ratio adjusted to correspond to the measured number of pulses.

In this instance, the adjustment of the gear ratio is the same as that during the warming-up time period. Namely, when the number of pulses is under the set number of 120 during the training, the indicator 50 generates pitch sounds corresponding to, for example, 75 revolutions larger than 70, so that the driver treads the pedals 62 at the pitch corresponding to 75 revolutions. If the number of pulses still remains under 120 even by pedalling at such a higher pitch, the indicator 52 displays a higher gear ratio, whereby he adjusts the gear ratio as displayed. On the other hand, when the measured number of pulses, during the training, exceeds the set number of 120 and the indicator 50 generates reduced pitch sounds corresponding to 65 revolutions so that the number of revolutions of pedals 62 is reduced to 65 revolutions, the measured number of pulses, if still over 120, allows the indicator 52 to display a lower gear ratio.

As clearly understood from the above description, the health promoting device of the invention enables anyone to take exercise for a fixed period of time for training exactly and simply by pedalling correspondingly to a proper number of pulses set by personal information, such as his age, sex distinction, height and weight. Furthermore, the running type device can give various displays necessary for the driver to exercise. As a result, he can repeat his bodily exercise every day without loosing interest, thereby naturally promoting his health.

While a preferred embodiment of the invention has been described using specific terms, such description is for illustrative purpose only, and it is to be understood that changes and variations may be made without departing from the spirit or scope of the following claims.

What is claimed is:

1. A running type health promoting device comprising:
   (a) a running vehicle comprising a frame, at least one front wheel and at least one rear wheel which are supported to said frame, a handle bar, a saddle, a pedalling device, and a transmitting device for transmitting the pedalling operation of said pedalling device to said rear wheel,
   (b) a microprocessing unit supported to said frame of the vehicle and having a processing circuit which sets a period of time for training and a proper number of pulses of a driver during the period of time for training corresponding to a proper quantity of bodily exercise, said microprocessing unit setting said period of time and proper number of pulses in response to an input means which provides personal information concerning said driver, and target information concerning a desired type of training which are input thereto,
   (c) a pulse detector which is electrically connected with an input of said microprocessing unit, for detecting the pulse of a driver who drives said vehicle, and feeds a detection signal of the detected driver pulse into said microprocessing unit, said microprocessing unit comparing a detected driver pulse with said proper number of pulses and setting a proper number of revolutions of the pedals required to achieve said proper quantity of bodily exercise during said time period,
   (d) a measuring instrument electrically connected with the input of said microprocessing unit so as to measure the training time period and feed a timing signal therefor into said microprocessing unit, said microprocessing providing an output when said set training period of time has elapsed,
   (e) an indicator electrically connected with the output of said microprocessing unit so as to indicate said proper number of revolutions of said pedals for matching the proper number of pulses set by said microprocessing unit and also indicating completion of said training when the driver completes training under the set number of pulses during the set time period, and
   (f) a source of electric energy electrically connected to operate said microprocessing unit, pulse detector, measuring instrument and indicator at least while said vehicle is being driven.

2. A running type health promoting device according to claim 1, wherein said transmitting device comprises at least one front chain gear incorporated with said pedal device, a plurality of rear chain gears having different diameters and being incorporated with said rear wheel, and a driving chain connecting said front and rear chain gears, and includes a derailleur which is provided in proximity to said rear chain gears and switches said driving chain to one of said rear chain gears to thereby change a gear ratio, said microprocessing unit further setting a proper gear ratio, said indicator indicating the proper gear ratio.

3. A running type health promoting device according to claim 1, wherein said input means includes an input selection circuit into which input data comprising personal information and target information for training are fed.

4. A running type health promoting device according to claim 1 wherein said indicator indicates the proper number of revolutions of said pedals by means of pitch sounds and indicates the completion of training by means of a continuous sound.

5. A running type health promoting device according to claim 1 further comprising means for detecting the revolutions of a wheel of said vehicle and applying a signal representing detected wheel revolution to said microprocessor unit, said microprocessor unit providing an indication of vehicle running speed and distance traveled to said indicator which indicates the same.

6. A running type health promoting device according to claim 1 further comprising means for detecting the revolutions of said pedalling device and applying a signal representing detected pedalling device revolutions to said microprocessor unit, said microprocessor unit providing an indication of pedalling device revolutions to said indicator which indicates the same.

7. A running type health promoting device according to claim 1 wherein said indicator receives an indication of said proper number of pulses from said microprocessor unit and indicates said proper number of pulses.

8. A running type health promoting device according to claim 1 wherein said microprocessor unit provides an indication of the detected pulse of a driver to said indicator which indicates the same.

9. A running type health promoting device according to claim 5 further comprising means for inputting to said microprocessor unit information on the diameter of the wheel whose revolutions are detected, said microprocessor unit using this information to indicate said running speed and distance traveled.

* * * * *